United States Patent
Kim et al.

(10) Patent No.: US 7,662,194 B2
(45) Date of Patent: Feb. 16, 2010

(54) BINDER COMPOSITION FOR FUEL CELL, MEMBRANE-ELECTRODE ASSEMBLY FOR FUEL CELL, AND METHOD FOR PREPARING THE MEMBRANE-ELECTRODE ASSEMBLY

(75) Inventors: Hyoung-Juhn Kim, Suwon-si (KR); Yeong-Chan Eun, Suwon-si (KR); Seong-Jin An, Suwon-si (JP); Sung-Yong Cho, Suwon-si (JP); Ju-Yong Kim, Suwon-si (KR); Hae-Kwon Yoon, Suwon-si (KR); Ho-Jin Kweon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 889 days.

(21) Appl. No.: 11/165,841

(22) Filed: Jun. 23, 2005

(65) Prior Publication Data

US 2007/0020507 A1    Jan. 25, 2007

(30) Foreign Application Priority Data

Jun. 30, 2004    (KR) ...................... 10-2004-0050768

(51) Int. Cl.
*H01M 4/82* (2006.01)
*H01M 8/10* (2006.01)
*H01M 4/00* (2006.01)
*H01M 4/88* (2006.01)

(52) U.S. Cl. .......................... 29/623.5; 429/33; 429/41; 429/44; 502/101

(58) Field of Classification Search .................. 429/33, 429/30, 41, 44, 46; 502/101; 29/623.1, 623.5
See application file for complete search history.

(56) References Cited

U.S. PATENT DOCUMENTS

| | | | |
|---|---|---|---|
| 5,525,436 | A | 6/1996 | Savinell et al. |
| 5,945,233 | A | 8/1999 | Onorato et al. |
| 6,946,211 | B1 * | 9/2005 | Bjerrum et al. ............... 429/33 |
| 2004/1008187 | | 4/2004 | Kim et al. |

FOREIGN PATENT DOCUMENTS

| | | |
|---|---|---|
| CN | 1492531 | 4/2004 |
| JP | 2000-195528 | 7/2000 |
| JP | 2001-510931 | 8/2001 |
| JP | 2003-115302 | 4/2003 |
| JP | 2004-6306 | 1/2004 |

* cited by examiner

*Primary Examiner*—Patrick Ryan
*Assistant Examiner*—Thomas H. Parsons
(74) *Attorney, Agent, or Firm*—Christie, Parker & Hale, LLP

(57) ABSTRACT

The present invention relates to a binder composition for a fuel cell including a proton conductor and one or more binders selected from the group consisting of poly[2,2'-(m-phenylene)-5,5'-bibenzimidazole] (PBI), poly[2,5-benzimidazole] (ABPBI), polybenzoxazole (PBO), and polybenzothiazole (PBT).

19 Claims, 1 Drawing Sheet

BINDER COMPOSITION FOR FUEL CELL, MEMBRANE-ELECTRODE ASSEMBLY FOR FUEL CELL, AND METHOD FOR PREPARING THE MEMBRANE-ELECTRODE ASSEMBLY

CROSS REFERENCE TO RELATED APPLICATION

This application claims priority to and the benefit of Korean Patent Application No. 10-2004-0050768 filed in the Korean Intellectual Property Office on Jun. 30, 2004, the entire disclosure of which is incorporated herein by reference.

FIELD OF THE INVENTION

The present invention relates to a binder composition, a membrane-electrode assembly (MEA), and a method for preparing the membrane-electrode assembly for a fuel cell. More specifically, the present invention relates to a binder composition for a fuel cell with improved proton conductivity at temperatures above 100° C., a membrane-electrode assembly manufactured by using the binder composition, and a method for preparing the membrane-electrode assembly.

BACKGROUND OF THE INVENTION

Fuel cells are highly efficient and clean power generators that directly convert oxygen from air and hydrogen from hydrocarbon fuels such as methanol, natural gas, etc., into electrical energy through electrochemical reactions. Fuel cells were developed as a means of providing power for spacecraft and military purposes in the United States in the 1970s. Since then, numerous research projects have been conducted to develop fuel cells for civilian purposes. Now, in many developed countries, such as the United States, Japan, the European countries, etc., intense research and development is being conducted for practical fuel cells, i.e., generally useful power sources for both military and civilian purposes, for use in everyday life.

A fuel cell can be classified as a phosphoric acid type, a molten carbonate type, a solid oxide type, a polymer electrolyte type, or an alkaline type of fuel cell depending upon the kind of electrolyte used. Among these, polymer electrolyte membrane fuel cells (PEMFCs), have been developed with reduced problems of corrosion or evaporation, superior power characteristics over conventional fuel cells due to their high current density per unit area, and lower operating temperatures. Such fuel cells have advantages in that they can be applied to a wide array of fields, such as for transportable electrical sources for an automobiles, for distributed power such as for houses and public buildings, and for small electrical sources for electronic devices.

A single cell is composed of a solid polymer electrolyte made of a proton exchange membrane, a fuel electrode attached on a side of the solid electrolyte, and an air electrode attached on the other side of the solid electrolyte. Typical fuel cell designs link together these single cells to form a stack to provide a more useful voltage. As a result, a fuel cell stack made by stacking these single cells in many layers is a core component of the fuel cell power plant system that is capable of generating several W to hundreds of kW of electricity.

In a polymer fuel cell power plant system, the performance (or capacity) of the membrane-electrode assembly has a great influence on the electricity generating characteristics. The membrane-electrode assembly described above consists of a polymer electrolyte membrane and a catalyst electrode layer. As the polymer electrolyte membrane, fluorine-based electrolyte membranes such as Nafion™ (DuPont), Flemion (Asahi Glass), Asiplex (Asahi Chemical), and Dow XUS (Dow Chemical) are widely used.

However, commercializing polymer electrolyte membrane fuel-cells as practical power sources has been difficult because the polymer electrolyte membranes currently used are relatively expensive.

In addition, in order to attach the above polymer electrolyte membrane to the catalyst electrode layer, a fluorine-based polymer solution with proton conductivity has usually been used as a binder for manufacturing the catalyst electrode layer. However, such fluorine-based polymer solutions tend to have low proton conductivity when the temperature is above 80° C. and the humidity is below 60%. Furthermore, fluorine-based polymer solutions have a low methanol crossover. For these reasons, it has been impossible to use fluorine-based polymer solutions in fuel cells operating at temperatures above 100° C.

SUMMARY OF THE INVENTION

According to one embodiment of the present invention, a binder composition is provided with superior binding effects and proton conductivity at high temperatures.

According to another embodiment of the present invention, a membrane-electrode assembly for a fuel cell is provided that is manufactured using such a binder composition According to still another embodiment of the present invention, a method of preparing the above membrane-electrode assembly for a fuel cell is provided.

According to one embodiment of the present invention, a binder composition for a fuel cell includes at least one binder selected from the group of consisting of poly[2,2'-(m-phenylene)-5,5'-bibenzimidazole] (PBI), poly[2,5-benzimidazole] (ABPBI), polybenzoxazole (PBO), and polybenzothiazole (PBT), and a proton conductor.

The present invention also provides a membrane-electrode assembly for a fuel cell including: a) a polymer electrolyte membrane for the fuel cell; b) a catalyst layer positioned on both sides of the above polymer electrolyte membrane which includes a catalyst, a binder, and a material with proton conductivity; and c) an electrode substrate positioned on both sides of the catalyst layer. Suitable binders include poly[2,2'-(m-phenylene)-5,5'-bibenzimidazole] (PBI), poly[2,5-benzimidazole] (ABPBI), polybenzoxazole (PBO), polybenzothiazole (PBT), and combinations thereof.

The present invention also provides a method of making the membrane-electrode assembly which includes the following process steps: a) forming the catalyst layer on one side of electrode substrates by applying the catalyst and the binder composition described above, and b) positioning the electrode substrates with the catalyst layers on both sides of a polymer electrolyte membrane for a fuel cell to join them together.

BRIEF DESCRIPTION OF THE DRAWING

The accompanying drawing, which is incorporated in and constitutes a part of the specification, illustrates an embodiment of the invention, and together with the description, serves to explain the principles of the invention.

DETAILED DESCRIPTION

Figure 1:
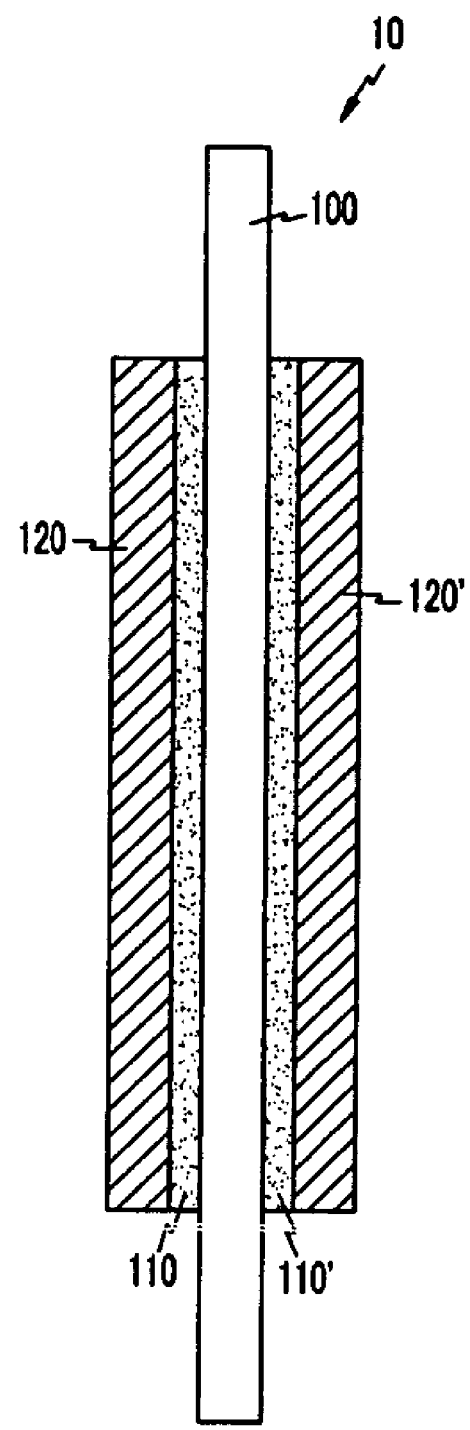
FIG. 1 is a schematic cross-sectional view of a membrane-electrode assembly of the present invention.

In the following detailed description, embodiments of the invention have been shown and described simply by way of illustration. As will be realized the invention is capable of modification in various respects, all without departing from the invention. Accordingly, the drawing and description are to be regarded as illustrative in nature, and not restrictive.

FIG. 1 is a schematic drawing of a cross-sectional view of a membrane-electrode assembly of the present invention. FIG. 1 shows that the membrane-electrode assembly 10 of the present invention includes: a) a polymer electrolyte membrane 100 for the fuel cell; b) catalyst layers 110, 110' positioned on both sides of the above polymer electrolyte membrane and in which a catalyst, a binder, and a material with proton conductivity are included; and c) electrode substrates 120, 120' positioned on the catalyst layers.

In the present invention, the binder composition for the fuel cell includes one or more of a poly-benzimidazole binder, a poly-benzoxazole binder, or a poly-benzothiazole binder, and a proton conductor. Preferably, in addition to a proton conductor, the binder composition for the fuel cell includes a material selected from the group consisting of poly[2,2'-(m-phenylene)-5,5'-bibenzimidazole], poly[2,5-benzimidazole], polybenzoxazole, polybenzothiazole, and combinations thereof.

The binder composition in the present invention can also be dissolved in an organic solvent to assist in applying the composition to the electrodes. Preferred organic solvents are polar solvents. Suitable polar solvents include trifluoroacetic acid, N-methylpyrrolidone, dimethylacetamide, and combinations thereof.

Suitable proton conductors include one or more acid compounds selected from the group consisting of $H_2SO_4$, $CH_3COOH$, and $H_3PO_4$.

The amount of the binder in the binder composition is not specifically limited. However, according to one embodiment of the invention, the binder is added to the total binder composition at a concentration between 0.01 and 0.5 g/ml in order to improve the coating capability of the catalyst layer.

Moreover, in one embodiment of the invention, the concentration of the proton conductor in the total binder composition is between 25 and 75 wt %. Such an amount improves proton conductivity.

Such binder compositions are superior in proton conductivity at high temperatures of about 100° C. or above, in adsorption of catalysts, and in binding capability to the polymer electrolyte membrane. Therefore, the above binder composition for the fuel cell can be used for forming the catalyst layer of the membrane-electrode assembly. However, the binder composition can also be used for making the membrane-electrode assembly for other types of fuel cells.

Conventionally, a membrane-electrode assembly (MEA) of a fuel cell is a term indicating a polymer electrolyte membrane with a catalyst layer attached on it. However, in the present invention, a membrane-electrode assembly means a laminate of an electrode substrate coated with a catalyst and a polymer electrolyte membrane.

Suitable binders include poly[2,2'-(m-phenylene)-5,5'-bibenzimidazole], poly[2,5-benzimidazole], polybenzoxazole, polybenzothiazole, and combinations thereof.

Suitable proton conductors include acid compounds selected from the group consisting of $H_2SO_4$, $CH_3COOH$, and $H_3PO_4$, and combinations thereof.

According to one embodiment of the invention, the catalyst layer of the membrane-electrode assembly for the fuel cell preferably comprises 3 to 5 molecules of proton conductor per repeating unit of the binder polymer. When the number of molecules of the proton conductor per repeating unit of the binder polymer is less than 3, proton conductivity is generally not sufficient, and when it is more than 5, adherence performance is deteriorated and efficiency does not increase as the amount of the proton conductor increases.

Suitable proton-conducting polymers include those selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, polyquinoxaline-based polymers, polybenzoxazole-based polymers, polybenzothiazole-based polymers, and combinations thereof. Preferred proton-conducting polymers include polyperfluorosulfonic acid, polyperfluorocarboxylic acid, co-polymers of tetrafluoroethylene and fluorovinylether containing sulfonic acid groups, defluorinated polyetherketone sulfides, aryl ketones, poly(2,2'-(m-phenylene)-5,5'-bibenzimidazole) (PBI), poly(2,5-benzimidazole) (ABPBI), polybenzoxazole (PBO), polybenzothiazole (PBT), and combinations thereof. However, according to the invention, the proton-conducting polymer included in the polymer electrolyte membrane for a fuel cell is not limited to these polymers.

The thickness of the catalyst layer can be varied for the size or use of the fuel cell. However, according to one embodiment, the thickness of the catalyst layer is from 1 μm to 100 μm. When the thickness of the catalyst layer is less than 1 μm, efficiency of the fuel cell is insufficient, and when the catalyst layer is thicker than 100 μm, it is difficult to utilize the catalyst efficiently, and the manufacturing cost of the fuel cell increases.

Suitable catalysts for the catalyst layer include metal catalysts selected from the group consisting of platinum, ruthenium, osmium, platinum-ruthenium alloys, platinum-osmium alloys, platinum-palladium alloys, platinum-M alloys (where M is at least one metal selected from the group consisting of Ga, Ti, V, Cr, Mn, Fe, Co, Ni, Cu, and Zn), and combinations thereof. Preferably, the catalyst is selected from the group consisting of platinum, ruthenium, osmium, platinum-ruthenium alloys, platinum-osmium alloys, platinum-palladium alloys, platinum-cobalt alloys, platinum-nickel alloys, and combinations thereof.

The electrode substrate supports the catalyst layer and also acts as a passage for supplying fuel and oxygen gas to the catalyst. The electrode substrate is preferably a carbon paper or a carbon cloth, which is also referred to as a gas diffusion layer (GDL).

In one embodiment of the invention, the electrode substrate includes a gas diffusion layer and a microporous layer. The microporous layer may include a conductive material formed with a micropore from several μm to several tens of μm in diameter. The conductive material is preferably at least one selected from the group consisting of graphite, carbon nanotube (CNT), fullerene, active carbon, Vulcan-X, ketjen black, and carbon nano fiber.

A method for preparing the membrane-electrode assembly for the fuel cell of the present invention includes: a) forming a catalyst layer on one side of each electrode substrate by applying the catalyst and binder composition; and b) positioning the electrode substrates with the catalyst layer onto both sides of the polymer electrolyte membrane for the fuel cell and joining them together.

The electrode substrate may also include a gas diffusion layer selected from carbon paper and carbon cloth. The above electrode substrate can also include a microporous layer as well as the above gas diffusion layer. Suitable microporous layers include a carbon layer with micropores. Preferred microporous layers include those selected from the group consisting of graphite, carbon nanotube (CNT), fullerene (C60), active carbon, carbon black, and combinations thereof.

The catalyst layer including the catalyst and binder composition for the fuel cell is formed on one side of the above electrode substrate. The thickness of the catalyst layer can be varied for the size or use of the fuel cell. According to one embodiment of the invention, the thickness of the catalyst layer varies from 1 μm to 100 μm When the catalyst layer is thinner than 1 μm the efficiency of the fuel cell is insufficient and when the catalyst layer is thicker than 100 μm , it is difficult to utilize the catalyst efficiently and the manufacturing cost of the fuel cell increases.

Suitable catalysts for use in the catalyst layer include metal catalysts such as platinum, ruthenium, osmium, platinum-ruthenium alloys, platinum-osmium alloys, platinum-palladium alloys, and platinum-M alloys (where M is at least one metal selected from the group consisting of Ga, Ti, V, Cr, Mn, Fe, Co, Ni, Cu, and Zn), and combinations thereof. Preferred catalysts include platinum, ruthenium, osmium, platinum-ruthenium alloys, platinum-osmium alloys, platinum-palladium alloys, platinum-cobalt alloys, platinum-nickel alloys, and combinations thereof.

The catalyst layer can be formed by coating a mixture of a catalyst and a binder composition as set forth above on one side of each of the electrode substrates. The catalyst layer can also be formed by coating a mixture of a catalyst and a fluorine-based binder compositions on one side of each of the electrode substrates and then applying a binder composition as set forth above thereon.

The fluorine-based binder composition used in the latter method can be made using a conventional fluorine-based binder. Suitable fluorine-based binders include polyperfluorosulfonic acid, polyperfluorocarboxylic acid, copolymers of tetrafluoroethylene and fluorovinylether including sulfonic acid groups, and combinations thereof.

Conventional coating methods can be used to coat the catalyst layer and the coating method of the binder composition for the fuel cell. Suitable methods include screen-printing methods, spray coating methods, slurry methods, and doctor blade methods. Such coating methods are well known, so any detailed explanation herein is omitted.

The above method can be applied to form a catalyst layer on one side of the electrode substrates and to join electrode substrates with the catalyst layer on both sides of the polymer electrolyte membrane in order to manufacture the membrane-electrode assembly of the present invention.

The polymer electrolyte membrane includes a proton-conducting polymer. Suitable proton conducting polymers include perfluoro-based polymers benzimidazole-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, polyquinoxaline-based polymers, polybenzoxazole-based polymers, polybenzothiazole-based polymers, and combinations thereof. Preferred proton-conducting polymers include polyperfluorosulfonic acid, polyperfluorocarboxylic acid, co-polymers of tetrafluoroethylene and fluorovinylether containing sulfonic acid groups, defluorinated polyetherketone sulfides, aryl ketones, poly(2,2'-(m-phenylene)-5,5'-bibenzimidazole) (PBI), poly(2,5-benzimidazole) (ABPBI), polybenzoxazole (PBO), and polybenzothiazole (PBT), and combinations thereof. However, the present invention is not limited to such proton-conducting polymers.

The above polymer electrolyte membrane and electrode substrates with catalyst layers can be joined by general methods. A solution in which the above polymer is dissolved can be directly coated on the gas diffusion layer to be cast into a film and laminated with the catalyst layer. It is also possible to manufacture the polymer electrolyte membrane separately and then join it with the electrode substrate.

The following examples illustrate the present invention in further detail. However, it is to be understood that the present invention is not limited by these examples.

EXAMPLE 1

1 g of $H_3PO_4$ was added to 20 ml of a mixed solvent of trifluoroacetic acid (TFA)/ m-methyl pyrrolidone (NMP)/ dimethylacetamide (DMAc) (1/1/1). After mixing the solution uniformly, 1 g of poly[2,2'-(m-phenylene)-5,5'-bibenzimidazole] (PBI) was added and dissolved in order to manufacture the binder composition.

The catalyst solution was manufactured by dispersing 3 g of a carbon-supported platinum (Pt) catalyst (Pt content: 20 wt %) into the binder composition.

The above catalyst solution was coated on a piece of carbon cloth by a screen printing method to form a 20 μm, thick catalyst layer. Using the same procedure, two pieces of carbon cloth with the catalyst layer were made.

The two pieces of carbon cloth, each with a catalyst layer, were positioned on both sides of the electrolyte membrane film made of poly[2,2'-(m-phenylene)-5,5'-bibenzimidazole] (PBI) and then hot-pressed to manufacture the membrane-electrolyte assembly.

EXAMPLE 2

The catalyst solution was manufactured by dispersing 3g of a carbon-supported platinum (Pt) catalyst (Pt content: 20 wt %) into 20 ml of the polyperfluorosulfonic acid solution (Nafion™ solution DE521 5wt %).

The above catalyst solution was coated on a piece of carbon cloth by the screen printing method to form a 20 μm thick catalyst layer. Using the same procedure, two pieces of carbon cloth with the catalyst layer were made.

1 g of $H_3PO_4$ was added to 20 ml of a mixed solvent of trifluoroacetic acid (TFA)/ m-methyl pyrrolidone (NMP)/ dimethylacetamide (DMAc) (1/1/1). After mixing the solution uniformly, 1 g of poly[2,2'-(m-phenylene)-5,5'-bibenzimidazole] (PBI) was added and dissolved in order to manufacture the binder composition.

After coating the above binder composition on the above catalyst layer by the spray method, a membrane-electrode assembly was manufactured by the same method as in Example 1.

COMPARATIVE EXAMPLE 1

A membrane-electrode assembly was manufactured by the same method as in Example 2, except that the binder composition including poly[2,2'-(m-phenylene)-5,5'-bibenzimidazole] (PBI) on the catalyst layer was not used.

COMPARATIVE EXAMPLE 2

A membrane-electrode assembly was manufactured by the same method as in Example 2 except that the polyperfluorosulfonic acid membrane (Nafion™ 117 Membrane) of DuPont was used as a polymer electrolyte membrane without coating the binder composition of poly[2,2'-(m-phenylene)-5,5'-bibenzimidazole] (PBI).

The binder composition in the present invention is suitable for a fuel cell operated at high temperatures due to the following advantages: superior proton conductivity at high temperatures; good adhesion of the catalyst; and superior binding capability to the polymer electrolyte membrane.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A binder composition for a fuel cell comprising:
    a proton conductor; and
    a binder selected from the group consisting of poly[2,2'-(m-phenylene)-5,5'-bibenzimidazole] (PBI), poly[2,5-benzimidazole] (ABPBI), polybenzoxazole (PBO), polybenzothiazole (PBT), and combinations thereof;
    wherein the proton conductor is present in an amount from 25 to 75 wt % of the binder composition and the binder is present in an amount from 0.01 to 0.5 g/ml of the total binder composition.

2. The binder composition according to claim 1, further comprising a solvent selected from the group consisting of trifluoroacetic acid, N-methyl pyrrolidone, dimethylacetamide, and combinations thereof.

3. The binder composition according to claim 1, wherein the proton conductor is an acid compound selected from the group consisting of $H_2SO_4$, $CH_3COOH$, $H_3PO_4$, and combinations thereof.

4. A membrane-electrode assembly for a fuel cell comprising:
    a polymer electrolyte membrane for the fuel cell;
    catalyst layers positioned on both sides of the polymer electrolyte membrane, wherein each of the catalyst layers comprises a catalyst and a binder composition comprising a proton conductor and a binder selected from the group consisting of poly[2,2'-(m-phenylene)-5,5'-bibenzimidazole] (PBI), poly[2,5-benzimidazole] (ABPBI), polybenzoxazole (PBO), polybenzothiazole (PBT), and combinations thereof;
    wherein the proton conductor is present in an amount from 25 to 75 wt % of the binder composition and the binder is present in an amount from 0.01 to 0.5 g/ml of the total binder composition; and
    an electrode substrate positioned on each catalyst layer.

5. The membrane-electrode assembly according to claim 4, wherein the polymer electrolyte membrane comprises a polymer selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyetheretherketone-based polymers, polyquinoxaline-based polymers, polybenzoxazole-based polymers, polybenzothiazole-based polymers, and combinations thereof.

6. The membrane-electrode assembly according to claim 4, wherein the polymer electrolyte membrane comprises a polymer selected from the group consisting of polyperfluorosulfonic acid, polyperfluorpcarboxylic acid, co-polymers of tetrafluoroethylene and fluorovinylether containing sulfonic acid groups, defluorinated polyetherketone sulfides, aryl ketones, poly(2,2'-(m-phenulene)-5,5'-bibenzimidazole) (PBI), poly(2,5-benzimidazole) (ABPBI), polybenzoxazole (PBO), polybenzothiazole (PBT), and combinations thereof.

7. The membrane-electrode assembly according to claim 4, wherein the catalyst comprises a material selected from the group consisting of platinum, ruthenium, osmium, platinum-ruthenium alloys, platinum-osmium alloys, platinum-palladium alloys, platinum-M alloys where M is a metal selected from the group consisting of Ga, Ti, V, Cr, Mn, Fe, Co, Ni, Cu, and Zn, and combinations thereof.

8. The membrane-electrode assembly according to claim 4, wherein the electrode substrate comprises a gas diffusion layer (GDL) selected from the group consisting of carbon paper and carbon cloth.

9. The membrane-electrode assembly according to claim 4, wherein the electrode substrate comprises:
    a gas diffusion layer (GDL) selected from the group consisting of carbon paper and carbon cloth; and
    a microporous layer (MPL) formed thereon.

10. The membrane-electrode assembly according to claim 9, wherein the microporous layer comprises a material selected from the group consisting of graphite, carbon nanotube (CNT), fullerene (C60), active carbon, carbon black, and combinations thereof.

11. The membrane-electrode assembly according to claim 9, wherein the catalyst layer comprises 3 to 5 molecules of proton conductor per repeating unit of the binder polymer.

12. A method for preparing a membrane-electrode assembly comprising:
    forming a catalyst layer on one side of each of two electrode substrates using a catalyst and a binder composition comprising:
    a proton conductor; and
    a binder selected from the group consisting of poly[2,2'-(m-phenylene)-5,5'-bibenzimidazole] (PBI), poly[2,5-benzimidazole] (ABPBI), polybenzoxazole (PBO), polybenzothiazole (PBT), and combinations thereof;
    wherein the proton conductor is present in an amount from 25 to 75 wt % of the binder composition and the binder is present in an amount from 0.01 to 0.5 g/ml of the total binder composition;
    positioning the electrode substrates with the catalyst layer on both sides of a polymer electrolyte membrane and joining said electrode substrates and the polymer electrolyte membrane together.

13. The method according to claim 12, wherein the electrode substrate comprises a gas diffusion layer (GDL) selected from the group consisting of carbon paper and carbon cloth.

14. The method according to claim 12, wherein the electrode substrate comprises:
    a gas diffusion layer (GDL) selected from the group consisting of carbon paper and carbon cloth; and
    a microporous layer (MPL) formed thereon.

15. The method according to claim 14, wherein the microporous layer comprises a material selected from the group consisting of graphite, carbon nanotube (CNT), fullerene (C60), active carbon, carbon black, and combinations thereof.

16. The method according to claim 12, wherein the catalyst comprises a material selected from the group consisting of platinum, ruthenium, osmium, platinum-ruthenium alloys, platinum-osmium alloys, platinum-palladium alloys, platinum-M alloys where M is at least one metal selected from the group consisting of Ga, Ti, V, Cr, Mn, Fe, Co, Ni, Cu, and Zn, and combinations thereof.

17. The method according to claim 12, wherein the catalyst layer is formed by coating a mixture of the catalyst and the binder composition.

18. The method according to claim 12, wherein the catalyst layer is formed by coating a mixture of the catalyst and a fluorine-based binder composition on the one side of the electrode substrate and coating the binder composition thereon.

19. The method according to claim 18, wherein the fluorine-based binder composition comprises a material selected from the group consisting of polyperfluorosulfonic acid, polyperfluorocarboxylic acid, copolymers of tetrafluoroethylene and fluorovinylether including sulfonic acid groups, and combinations thereof.

* * * * *

UNITED STATES PATENT AND TRADEMARK OFFICE
CERTIFICATE OF CORRECTION

PATENT NO. : 7,662,194 B2
APPLICATION NO. : 11/165841
DATED : February 16, 2010
INVENTOR(S) : Hyoung-Juhn Kim et al.

It is certified that error appears in the above-identified patent and that said Letters Patent is hereby corrected as shown below:

In the Claims

Column 7, Claim 6, line 66    Delete "polyperfluorpcarboxylic" Insert -- polyperfluorocarboxylic --

Column 8, Claim 6, line 2    Delete "(m-phenulene)" Insert -- (m-phenylene) --

Signed and Sealed this
Thirtieth Day of August, 2011

David J. Kappos
*Director of the United States Patent and Trademark Office*